United States Patent [19]

Janssen et al.

[11] Patent Number: 4,788,100
[45] Date of Patent: Nov. 29, 1988

[54] LENGTH OF MATERIAL, IN PARTICULAR FOR FILTERING, METHOD FOR ITS MANUFACTURE AND APPLICABILITY

[75] Inventors: Eberhard Janssen, Düren-Echtz; Willi Hunold, Merzenich, both of Fed. Rep. of Germany

[73] Assignee: Thomas Josef Heimbach GmbH & Co., Dueren, Fed. Rep. of Germany

[21] Appl. No.: 40,871

[22] Filed: Apr. 21, 1987

[30] Foreign Application Priority Data

May 2, 1986 [DE] Fed. Rep. of Germany ....... 3614949

[51] Int. Cl.⁴ .............................................. B32B 5/02
[52] U.S. Cl. .................................. 428/234; 427/365; 427/366; 427/412; 427/389.9; 427/394; 428/235; 428/300; 428/301; 428/311.1; 428/317.9
[58] Field of Search ............... 428/234, 235, 300, 301, 428/311.1, 317.9; 427/365, 366, 412, 389.9, 394

[56] References Cited

U.S. PATENT DOCUMENTS 3,617,442  11/1971  Hurschman ..................... 162/212
4,271,222  6/1981  Hahn ................................. 428/193
4,369,081  1/1983  Curry et al. ...................... 428/235
4,529,643  7/1985  Lundström ....................... 428/300

FOREIGN PATENT DOCUMENTS 0156062  2/1985  European Pat. Off. .
1560180  7/1969  Fed. Rep. of Germany .
2400827  7/1975  Fed. Rep. of Germany .

OTHER PUBLICATIONS

Verbessertes Entstaubungs Filter Medium Zur Oberfladen Filtration, Wasser, Luft und Betriebe, 1985, p. 49, Certified translation attached.
H. J. Ochs, Filterschaum-Perfekt in Vielen Bereichen, 1984, pp. 43–46.

Primary Examiner—Marion C. McCamish
Attorney, Agent, or Firm—Shlesinger, Arkwright & Garvey

[57] ABSTRACT

A filter fabric comprises a needle felt substrate comprised of a non-woven air permeable fabric having spaced surfaces. An open pour air permeable plastic foam is incorporated into the substrate and extends from one surface toward the other.

18 Claims, 1 Drawing Sheet

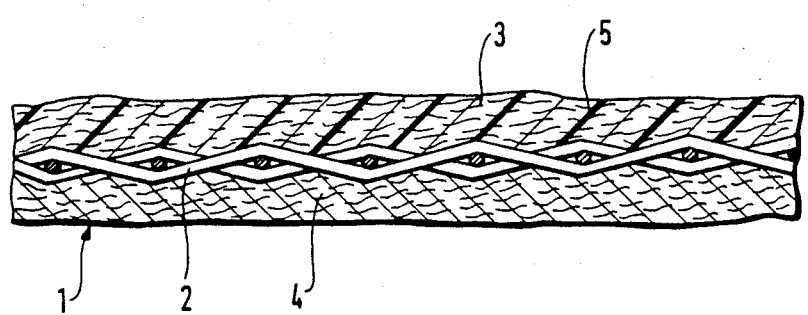

LENGTH OF MATERIAL, IN PARTICULAR FOR FILTERING, METHOD FOR ITS MANUFACTURE AND APPLICABILITY

The invention concerns a length of material, in particular for filtering, made of or with needle felt which is a substrate for an open-pore plastic foam.

Presently much use is made of reticulated, i.e. open-pore, filter foams illustratively made of polyurethane or acrylic acid esters [OCHS, Filterschaum-Perfekt in vielen Bereichen; Wasser, Luft und Betrieb 10/84, pp 43]. The advantages over non-woven fiber materials are their homogeneous structures which are more than three-dimensional. Moreover, the permeability of such filter foams can be set tightly and reproducibly.

In one illustrative application the filter foam is deposited layer-wise on a needle felt in such a manner that the cellular foam adheres on the surface of the needle felt where it forms a filter layer. The claimed advantages are that the coating provides higher separability and low particle penetration, further a smooth surface with improved cleaning behavior over conventional needle felts (Improved dust-removing filter medium for the surface filtration, in Wasser, Luft und Betrieb 11-12/85, p. 49).

This filter medium incurs the drawback that the filter foam poorly adheres to the surface of the needle felt and therefore frequently will not stand mechanical stresses. This behavior may be related to the different elasticities of filter foam and needle felt and to the contact areas between foam and fiber substrates being too small for good adhesion. As a result, the applicability of such filter media is limited.

Open-pore plastic foams already have been tried in the field of papermaking machine coverings. Illustratively the U.S. Pat. No. 3,617,442 discloses a covering for the Fourdrinier area of a papermaking machine, the covering consisting of a support enclosed by an open pore foam layer. However such coverings have been found inadequate and accordingly are no longer in use. The enclosing foam failed to withstand the rigorous stresses precisely in the Fourdrinier area and the covering was rapidly ruined.

The European Offenlegungsschrift No. 0 156 062 discloses a new attempt to use open pore plastic foam for the coverings of papermaking machines, in particular in its drying area. This document proposes to mount the plastic foam inside a filament link belt or a fabric, whereby the plastic foam will not project beyond the outer edges of the filament link belt or fabric. The procedure is such that the plastic foam is deposited on a surface, whereby it will sink into the fabric or filament link belt, the remaining and projecting amount then being scraped off. The air permeability can be adjusted for the whole belt within wide limits and very uniformly using the plastic foam.

Even in this kind of combination of a support structure—in this instance a filament link belt or a fabric—with an open pore plastic, the differential behaviors under mechanical and thermal stresses have been ignored. The plastic threads constituting the filament link belt or the fabric are rigid compared to the plastic foam, forming smooth structures at their surfaces which, especially in a papermaking machine, will carry out comparatively large relative displacements because of their being subjected therein to pronounced deflections and hence flexures. As a result corresponding shear forces are applied to the boundary surfaces between the plastic threads and the plastic foam, whereby fraying first and then large-area detachment will take place already in a short time.

The object of the invention is to discover a length of material consisting of a basic structure with a layer of plastic foam, that is characterized by substantially improved service life, and hence by a more universal applicability relative to the previously known lengths of material.

This problem is solved by the invention in that a needle felt is used in manner known per se wherein, contrary to the state of the art, the plastic foam is entirely incorporated into the needle felt, and, depending on the requirement, only across part of the whole of the cross-section of the needle felt.

By entirely incorporating the plastic foam into the pores of the needle felt, an extraordinarily thorough and solid bonding is achieved between the fibers and the foam. The random and dense distribution of the fibers anchors the layer of plastic foam in the needle felt so that fraying and detachment no longer occur, even under very strong mechanical stresses. This fact is enhanced by the elasticity of the individual fibers of the fiber layer because the fibers very easily adapt to the elastic motions of the plastic foam when the length of material is being bent, and thereby no separation takes place between the foam and the fibers.

It was found in surprising manner that the filtering properties of the plastic foam do not suffer by this foam being completely imbedded in the needle felt. Manifestly the homogeneity of the plastic—which is considered advantageous relative to pure needle felt filters—is not degraded by the intrinsically homogeneously distributed needle felt fibers to such an extent that filtering drawbacks arise.

In the embodiment of the invention, the needle felt is provided in manner known per se with a bracing structure acting as reinforcement. Such a bracing structure may consist of a fabric of knits, a filament link belt, furthermore of a layer with thicker and hence stiffer fibers. The bracing structure shall then be held in place substantially clear off the plastic foam which thereby shall be restricted to the layer of fibers, which will be fine fibers in the event of multilayer construction. In this manner, detachment problems between the bracing fabric and the plastic foam will be averted, even though they would be less fateful in the design of the invention due to the integration into the fiber layer as would be the case for the design of the European Offenlegungsschrift No. 0 156 062.

In a further embodiment of the invention, the needle felt is formed by fiber non-woven fabrics stitched on both sides to the bracing structure. The plastic foam in this case can also be imbedded in both sides of the needle felt to achieve corresponding filtration effects or air permeabilities. Depending on the required properties, plastic foams with different properties and mutually different depths of penetration may be used.

The invention furthermore provides that the surface of the length of material be smoothed on the side(s) equipped with plastic foam. The smooth surface achieved in this manner advantageously affects the cleaning behavior when the length of material is used in filtration. Again the smooth surface offers advantages where the length of material is used in papermaking machines.

The plastic foam incorporated into the needle felt in the design of the invention moreover is extraordinarily well suited as a substrate for substances which, depending on the application, will endow the length of material with additional and specific properties. Such substances in particular may be hydrophobic, adsorptive, anti-adhesive, oleophobic, antistatic and/or flame inhibiting, the substances being listed for their above cited effects in particular and pertinent reference texts, especially ROEMPPS CHEMIELEXIKON.

Furthermore, catalytic substances may be incorporated into the plastic foam so that, besides mechanical filtration, elimination of chemically noxious substances—for instance oxides of nitrogen and/or sulfure—be achieved. The substances may be imbedded in particles or in fiber form. The applicable substances for eliminating the noxious materials are the conventional ones found in the professional literature.

The length of material of the invention is manufactured by first forming a needle felt and then depositing a layer of plastic foam. In order to completely imbed this layer of plastic foam into the needle felt, this layer subsequently is calendered in conformity with the invention. This kind of manufacture offers the advantage that, by heat and pressure, the entire structure will be strengthened and simultaneously the surface so made also will be smoothed. Surprisingly, in this procedure the brittling of the surface fibers occurring when calendering needle felts without deposited plastic foam no longer takes place. Apparently the heat in the fibers passes so rapidly into the enclosing plastic foam that these fibers will not be degraded, and that their initial elasticity—which is important to keep the plastic foam inside the needle felt—is retained.

Because of the extraordinarily advantageous service-life properties, the length of material of the invention is suitable not only for filtration but also for use in papermaking machines, and therein in particular in the drying zone and also in the pressing area. Due to the imbedding of the invention of the plastic foam into the needle felt, long operating runs are achieved in the papermaking machine in spite of the high thermal and mechanical stresses. Accordingly it is henceforth possible to utilize the advantageous properties of open pore plastic foams without having to fear drawbacks concerning the service life of such lengths of material, as is the case in known papermaking machine coverings without plastic foam.

The drawing illustrates the invention in further detail by means of an illustrative embodiment. It shows a partial cross-section of the length of material (1) in the form of needle felt. This length has a bracing fabric (2) of which the weave can be adapted to the particular requirements. In the present instance, a plain fabric in tabby weave is shown.

A non-woven fiber fabric (3, 4) is stitched to both sides of the bracing fabric (2). The formation of the individual fibers and their density also is adapted by the rules of the state of the art to the particular requirements. An open pore plastic foam (5) is imbedded in the upper non-woven fiber fabric (3) and extends as far inside as the bracing fabric (2). It fills the gaps between the fibers of the non-woven fiber fabric (3) and goes as far as its surface without however projecting beyond it.

The insertion of the plastic foam is carried out by first depositing a layer of plastic foam on the surface of the non-woven fiber fabric (3) using methods known per se. Thereupon the length of material so made undergoes calendering, whereby the layer of plastic foam is completely pressed into the fiber non-woven fabric (3). Simultaneously a very smooth surface is achieved, which represents an advantage both in filtration applications and in coverings for papermaking machines.

We claim:

1. A fabric for paper machines and the like, comprising:
   (a) a needle felt substrate comprised of a non-woven air permeable fabric having spaced surfaces; and,
   (b) an open pore air permeable plastic foam incorporated into said substrate and extending from one surface toward the other.

2. The fabric of claim 1, further comprising:
   (a) a bracing structure disposed within said substrate intermediate said surfaces.

3. The fabric of claim 2, wherein:
   (a) said foam terminating short of said bracing structure.

4. The fabric of claim 2, wherein:
   (a) said substrate comprised of first and second fabric layers;
   (b) said bracing structure is disposed between said layers; and,
   (c) said layers are stitched to said bracing structure.

5. The fabric of claim 1, wherein:
   (a) said foam extending from each of said surfaces.

6. The fabric of claim 1, wherein:
   (a) the foam at said one surface is smooth.

7. The fabric of claim 1, wherein:
   (a) said foam incorporating a member selected from the group consisting of hydrophobic, adsorptive, anti-adhesive, oleophobic, anti-static, flame-inhibiting substances and mixtures thereof.

8. The fabric of claim 1, wherein:
   (a) said foam incorporating catalytic substances for eliminating noxious chemicals.

9. A filter fabric, comprising:
   (a) a bracing structure;
   (b) first and second non-woven air permeable fiber fabrics;
   (c) each fabric disposed along a side of said structure so that said structure is positioned between said fabrics;
   (d) means secure each of said fabrics to said structure for thereby forming an air permeable substrate; and,
   (e) an open pore air permeable plastic foam calendered into a first surface of said substrate and extending therein toward said structure.

10. The fabric of claim 9, wherein:
    (a) said foam terminating short of said structure.

11. The fabric of claim 10, wherein:
    (a) the foam at said first surface is smooth.

12. The fabric of claim 10, wherein:
    (a) said open pore air permeable plastic foam is calendered into opposite surfaces of said substrate and extends toward said structure.

13. The fabric of claim 9, wherein:
    (a) said foam incorporating a member selected from the group consisting of hydrophobic, adsorptive, anti-adhesive, oleophobic, anti-static, flame-inhibiting substances and mixtures thereof.

14. The fabric of claim 9, wherein:
    (a) said foam incorporating a catalytic substance therein for eliminating noxious chemicals.

15. The method of manufacturing a filter fabric, comprising the steps of:

(a) providing a needle felt substrate comprised of a non-woven air permeable fabric;
(b) depositing a supply of open pore air permeable plastic foam on a surface of the substrate;
(c) completely pressing the foam into the substrate by calendering; and,
(d) heating the substrate.

16. The method of claim 15, including the step of:
(a) incorporating into the foam a member selected from the group consisting of hydrophobic, adsorptive, anti-adhesive, oleophobic, anti-static, flame-inhibiting substances and mixtures thereof.

17. The method of claim 15, including the step of:
(a) incorporating into the foam a catalytic substance for eliminating noxious chemicals.

18. The method of claim 15, including the step of:
(a) depositing a supply of plastic foam which is sufficient to permit the foam to penetrate the substrate but to stop short of a bracing structure positioned within the substrate.

* * * * *